(12) United States Patent
Kikkawa

(10) Patent No.: US 11,084,479 B2
(45) Date of Patent: Aug. 10, 2021

(54) VEHICLE BRAKE PAD MONITORING

(71) Applicant: Continental Automotive GmbH, Hannover (DE)

(72) Inventor: Masahiro Kikkawa, Yokohama (JP)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 183 days.

(21) Appl. No.: 16/146,076

(22) Filed: Sep. 28, 2018

(65) Prior Publication Data
US 2019/0100191 A1    Apr. 4, 2019

(30) Foreign Application Priority Data

Oct. 4, 2017 (GB) ..................................... 1716147

(51) Int. Cl.
*B60T 17/22* (2006.01)
*F16D 66/02* (2006.01)
(Continued)

(52) U.S. Cl.
CPC .............. *B60T 17/221* (2013.01); *B60T 8/96* (2013.01); *F16D 66/021* (2013.01); *G05D 1/021* (2013.01);
(Continued)

(58) Field of Classification Search
CPC .......... B60T 17/221; B60T 8/96; B60T 17/22; F16D 66/021; G05D 1/021; G07C 5/0808; G07C 5/085; B60Q 9/00
See application file for complete search history.

(56) References Cited

U.S. PATENT DOCUMENTS 6,367,597 B1 *   4/2002   De Vries .................. B60T 13/74
                                                                188/196 V
7,760,080 B2    7/2010   Breed et al.
(Continued)

FOREIGN PATENT DOCUMENTS

CN          104455120 A       3/2015
JP          2004142649 A      5/2004

OTHER PUBLICATIONS

Extended European Search Report for European Application No. 18 197 396.7, dated Feb. 26, 2019, 10 pages.
(Continued)

*Primary Examiner* — Aniss Chad
*Assistant Examiner* — Chase L Cooley
(74) *Attorney, Agent, or Firm* — RatnerPrestia

(57) ABSTRACT

A method for operating a vehicle is disclosed. The method includes receiving, at a processor, a brake pad signal from a braking system of the vehicle, each brake pad signal including information on a pad wear value associated with a set of source brake pads. The processor determines whether the pad wear value from the brake pad signal exceeds a pad wear threshold and in response to the brake pad signal exceeding the pad wear threshold further determines a degradation delay from an initial detection of the pad wear threshold being exceeded wherein the degradation delay is determined based on vehicle operating data. The processor causes the disabling of one or more first level vehicle features including an autonomous or semi-autonomous mode of operating the vehicle based on the degradation delay reaching a delay threshold.

15 Claims, 3 Drawing Sheets

(51) Int. Cl.
  *B60T 8/96* (2006.01)
  *G05D 1/02* (2020.01)
  *G07C 5/08* (2006.01)
  *B60Q 9/00* (2006.01)
  *B60C 9/00* (2006.01)

(52) U.S. Cl.
  CPC .......... *G07C 5/085* (2013.01); *G07C 5/0808* (2013.01); *B60C 9/00* (2013.01); *B60T 17/22* (2013.01)

(56) References Cited

U.S. PATENT DOCUMENTS

| | | | |
|---|---|---|---|
| 9,315,178 B1* | 4/2016 | Ferguson | B60W 30/16 |
| 2006/0273148 A1 | 12/2006 | Karstens | |
| 2009/0198427 A1* | 8/2009 | Christopher Jackson | B60T 8/1708 701/70 |
| 2010/0030490 A1* | 2/2010 | Wright | F16D 66/02 702/34 |
| 2012/0083959 A1 | 4/2012 | Dolgov et al. | |
| 2015/0081159 A1 | 3/2015 | Park et al. | |
| 2016/0214595 A1 | 7/2016 | Baehrle-Miller et al. | |
| 2017/0090480 A1 | 3/2017 | Ho et al. | |
| 2018/0134161 A1* | 5/2018 | Gaither | B60T 8/172 |
| 2019/0135257 A1* | 5/2019 | Medinei | B60T 13/662 |

OTHER PUBLICATIONS

Great Britain Search Report for Application No. GB1716147.2, dated Mar. 26, 2018—3 pages.
Howard, B., "After 130 Million Miles of Autopilot Driving, Tesla Records a Fatality. Will One High-Profile Crash Turn and Government Opinion Against Autonomous Driving?", Motor, Sep. 2016—pp. 16 and 18.
Chiese Office Action for Chinese Application No. 201811140155.X, dated Sep. 7, 2020, 5 pages.
European Examination Report for EP Application No. 18197396.7, dated Mar. 11, 2021, 6 pages.
Chinese Notification to Grant Patent Right for Invention for Chinese Application No. 201811140155.X, dated Mar. 9, 2021 with translation, 6 pages.

* cited by examiner

VEHICLE BRAKE PAD MONITORING

CROSS REFERENCE TO RELATED APPLICATIONS

This application claims priority to Great Britain Patent Application No. 1716147.2, filed Oct. 4, 2017, the contents of such applications being incorporated by reference herein.

FIELD OF THE INVENTION

The present disclosure relates to methods and apparatus for monitoring the brake pads of a vehicle and taking one or more actions based on said monitoring.

BACKGROUND OF THE INVENTION

The braking systems of vehicles typically comprise at least two front brakes and two rear brakes, each equipped with a corresponding set of brake pads. In order to achieve a braking effect, the brake pads are actuated from a rest to an operative state where they grip a brake rotor with an amount of braking force required to achieve the desired amount of deceleration.

Drivers may be alerted to the need for brake pad replacement either through the use of mechanical or electrical pad wear sensors. The mechanical sensors may comprise a metallic plate which is embedded within the brake pad material when the brake pad is new and exposed when the brake pads are worn down. When the metallic plate is exposed, it scratches against the brake rotor to produce a screeching or scraping noise when the car is moving. The driver is supposed to be alerted to the need for brake pad replacement when he hears the screeching or scraping noise. There are a number of issues with this method of notification. Firstly, the driver may have difficulty hearing the noise if the cabin of the vehicle is well insulated from external noise. Furthermore, even if the driver hears the noise, he may have difficulty associating it with faulty brake pads.

As for electronic sensors, they may comprise a metal conductor embedded in a brake pad material. The metal conductor creating a current flow and corresponding warning signal when it is exposed and in contact with a brake rotor. Alternatively, electronic sensors may also be position sensors which detect brake pad wear based on the distance the brake pads have to move before the brake is applied. An electric warning signal is produced when the distance exceeds a predefined threshold. In the case of electronic sensors, a driver of the vehicle is typically warned of the need for brake pad replacement by the lighting up of a warning icon situated on the vehicle's instrument panel.

In most the vehicle remains drivable even though the brake pads are due for replacement and any degradation in vehicle performance may not be noticeable. As a result, the driver may be inclined to ignore the warning and delay brake pad replacement until there is an obvious safety risk. In some situations, this delay may render it unsafe for the vehicle to be operated in particular during wet weather conditions and winding roads. Therefore, it is desirable to have method and apparatus that facilitates safer operation of a vehicle when one or more brake pads are worn down.

SUMMARY OF THE INVENTION

Aspects of this disclosure provide methods and apparatus for monitoring the extent of wear associated with one or more sets of brake pads on a vehicle and taking one or more actions accordingly.

A first aspect of this disclosure provides, a method for operating a vehicle comprising receiving, at a processor, a brake pad signal from a braking system of the vehicle, each brake pad signal comprising information on a pad wear value associated with a set of source brake pads. The method also comprises determining, by the processor, whether the pad wear value from the brake pad signal exceeds a pad wear threshold and determining, by the processor, in response to the pad wear value exceeding the pad wear threshold, a degradation delay from an initial detection of the pad wear threshold being exceeded wherein the degradation delay is determined based on vehicle operating data. The method further comprises the processor causing the disabling of one or more first level vehicle features based on the degradation delay reaching a delay threshold. Therefore, the disabling of the one or more first level vehicle, features is not executed immediately upon an initial detection of the pad wear threshold being exceeded but only after the degradation delay reaches a delay threshold. The immediate disabling of the first level vehicle features may cause inconvenience to the driver, therefore, this advantageously gives the driver some time to replace faulty brake pads. Further the one or more first level vehicle features being disabled may also include an autonomous or semi-autonomous mode of, operating the vehicle. The wearing down of brake pads have an impact on braking efficiency thereby making it potentially unsafe to operate a vehicle in a semi or fully autonomous mode as characteristics such as braking distance and force may no longer accurately estimated. Therefore, disabling an autonomous or semi-autonomous mode of operating the vehicle provides for safer operation of the vehicle. Examples of such semi or fully autonomous driving features include adaptive cruise control (ACC) or highly automated driving (HAD). In some variations, the step of causing the disabling of one or more first level vehicle features is further based on information relating to other vehicle operating data. Vehicle operating data refers to any information relevant to the operating of a vehicle and may comprise information indicative of one or more of vehicle dynamics, the current state of the vehicle, the vehicle's environmental conditions or driving environment or a combination thereof. For instance, the disabling of one or more first level vehicle features may only be executed if the values of other vehicle operating data which are critical to vehicle safety exceed acceptable limits. This other vehicle operating data may comprise the condition of at least one of vehicle tires, braking system or transmission control system. Vehicle operating data related to the vehicle's driving environment may also be considered such as road surface conditions and curvature of roads being traversed by the vehicle.

In some implementations, the processor may further calculate a pad deterioration value in response to the brake pad signal exceeding the pad wear threshold. One or more second level behaviour is then executed if the pad deterioration value is within a specified threshold. Preferably, the second level behaviour alerts, encourages and/or incentivises a driver to replace brake pads which have exceeded the pad wear threshold. The conditions for triggering second level behaviours are preferably also structured such that the second level behaviours are triggered before the first level behaviours such that there is tiered approach to warning a driver of the need to replace faulty brake pads. The actions taken to raise the awareness of the driver being more drastic the longer he or she waits to replace faulty brakes. In some examples, the second level behaviour comprises disabling one or more a second level vehicle features, wherein any loss of vehicle operation associated with the second level vehicle features is less disruptive to a driver of the vehicle compared to the first level vehicle features.

In some implementations, the method may comprise determining, by the processor, in response to the brake pad data exceeding the pad wear threshold whether a critical event has occurred based on the vehicle operating data. The processor causing the disabling one or more first level vehicle features including an autonomous or semi-autonomous mode of operating the vehicle based at least in part on the critical event occurring. A critical event is defined as one which makes it unsafe to offer one or more first level vehicle features due to the predicted condition of the brake pads either alone or in combination with other conditions associated with the vehicle and/or its environment. In an optional implementation, the disabling of one or more first level vehicle features may also be further based on information relating to other vehicle operating data. For instance, if the values of other vehicle operating data which are critical to vehicle safety exceed acceptable limits. This other vehicle operating data may comprise the condition of at least one of vehicle tires, braking system or transmission control system. Vehicle operating data related to the vehicle's driving environment may also be considered. The disabling of the one or more first level vehicle features based at least in part upon the detection of a critical event occurring instead of waiting for the degradation delay to reach the delay threshold provides for a safer operation of the vehicle. In some examples, a critical event may be defined as having occurred when the total distance travelled by a vehicle since an initial detection of the pad wear threshold being exceeded crosses a distance threshold.

In another optional implementation of the disclosure, determining if the degradation delay has reached the delay threshold may comprise determining if a counter value of a brake pad counter has reached a maximum counter value. In some examples, the method further comprises having the processor determine in response to the brake pad signal exceeding the pad wear threshold whether a first predefined condition is met based on the vehicle operating data and increasing the counter value by a first value in response to the first predefined condition being met. The first predefined condition may comprise actuating a vehicle ignition switch from an on to off position. In some implementations, the method further comprises having a first value which varies depending on whether the source brake pads are front brake pads or rear brake pads of the vehicle. This advantageously allows any differences in wearing down rates and hence manifestations of potential safety issues to be taken into account. In some examples, a higher first value is used when the source brake pads are the front brake pads compared to when the source brake pads are the rear brake pads.

In some implementations, the method further comprises determining by the processor, in response to the brake pad signal exceeding the pad wear threshold whether a second predefined condition is met. If the second predefined condition is met, the counter value is increased by a second value. Therefore, both the second predefined conditions and the first predefined conditions may contribute to an increment in counter value. This second predefined condition is preferably tied to conditions which accelerate the wearing down of brake pads thus making it beneficial for safety reasons to have the one or more first level vehicle features preferably including an autonomous or semi-autonomous mode of operating the vehicle to be disabled earlier. Determining whether the second predefined condition is met may, for example, comprise determining whether one or more specified driving patterns have been applied to the vehicle over a specified period of time, distance and/or at a specified frequency. The one or more specified driving pattern may comprise driving patterns which are characterised by high vehicle dynamic braking and/or aggressive driving.

Another aspect of the disclosure provides a safety controller for a vehicle comprising a processor and at least one memory coupled to the processor and storing instructions, executable by the processor causing the processor to receive a brake pad signal from a braking system of the vehicle, each brake pad signal comprising information on a pad wear value associated with a set of source brake pads. The processor is caused to determine whether the pad wear value from the brake pad signal exceeds a pad wear threshold and determine in response to the pad wear threshold being exceeded a degradation delay from an initial detection of the pad wear threshold being exceeded wherein the degradation delay is determined based on vehicle operating data. The processor causes the disabling of one or more first level vehicle features based on the degradation delay reaching a delay threshold. The one or more first level vehicle features may include an autonomous or semi-autonomous mode of operating the vehicle. In some implementations, the disabling of one or more first level vehicle features caused by the processor is further based on information relating to other vehicle operating data. For instance, the disabling of one or more first level vehicle features may only be caused if the values of other vehicle operating data which are critical to vehicle safety exceed acceptable limits. This other vehicle operating data may comprise the condition of at least one of vehicle tires, braking system or transmission control system. Vehicle operating data related to the vehicle's driving environment may also be considered.

In some implementations, the processor may be further caused to calculate a pad deterioration value in response to the brake pad signal exceeding the pad wear threshold and the execution of one or more second level behaviour is then executed if the pad deterioration value is within a specified threshold. The conditions for triggering second level behaviours are preferably also structured such that the second level behaviours are triggered before the first level behaviours such that there is tiered approach to warning a driver of the need to replace faulty brake pads. In some examples, the second level behaviour comprises disabling one or more a second level vehicle features, wherein any loss of vehicle operation associated with the second level vehicle features is less disruptive to a driver of the vehicle compared to the first level vehicle features.

In some implementations, the processor may be further caused to determine in response to the brake pad data exceeding the pad wear threshold whether a critical event has occurred based on the vehicle operating data. The processor being caused to cause the disabling one or more first level vehicle features including an autonomous or semi-autonomous mode of operating the vehicle based at least in part on the critical event occurring. In some examples, a critical event may be defined as having occurred when the total distance travelled by a vehicle since an initial detection of the pad wear threshold being exceeded crosses a distance threshold.

In another optional implementation of the disclosure, determining if the degradation delay has reached the delay threshold may comprise determining if a counter value of a brake pad counter has reached a maximum counter value. In some examples, the memory may cause the processor to determine in response to the brake pad signal exceeding the pad wear threshold whether a first predefined condition is met based on the vehicle operating data. The processor is caused to increase the counter value by a first value in response to the first predefined condition being met. In some examples, the first predefined condition may comprise actuating of a vehicle ignition switch from an on to off position. The first value may also vary depending on whether the source brake pads are front brake pads or rear brake pads of the vehicle. For instance, a higher first value may be used when the source brake pads are the front brake pads compared to when the source brake pads are the rear brake pads.

In some implementations, the memory may also cause the processor to determine n response to the brake pad signal exceeding the pad wear threshold whether a second predefined condition has been met and increase the counter value by a second value in response to the second predefined condition being met. In some implementations, determining whether the second predefined condition has been met comprises determining whether one or more specified driving patterns have been applied to the vehicle over a specified period of time, distance and/or at a specified frequency. The one or more specified driving pattern may comprise driving patterns which are characterised by high vehicle dynamic braking and/or aggressive driving.

The details of one or more implementations of the disclosure are set forth in the accompanying drawings and the description below. Other aspects, features, and advantages will be apparent from the description and drawings, and from the claims.

DETAILED DESCRIPTION OF THE PREFERRED EMBODIMENTS

In the following detailed description, reference is made to the accompanying figures. In the figures, similar symbols typically identify similar components, unless context dictates otherwise.

Figure 1:
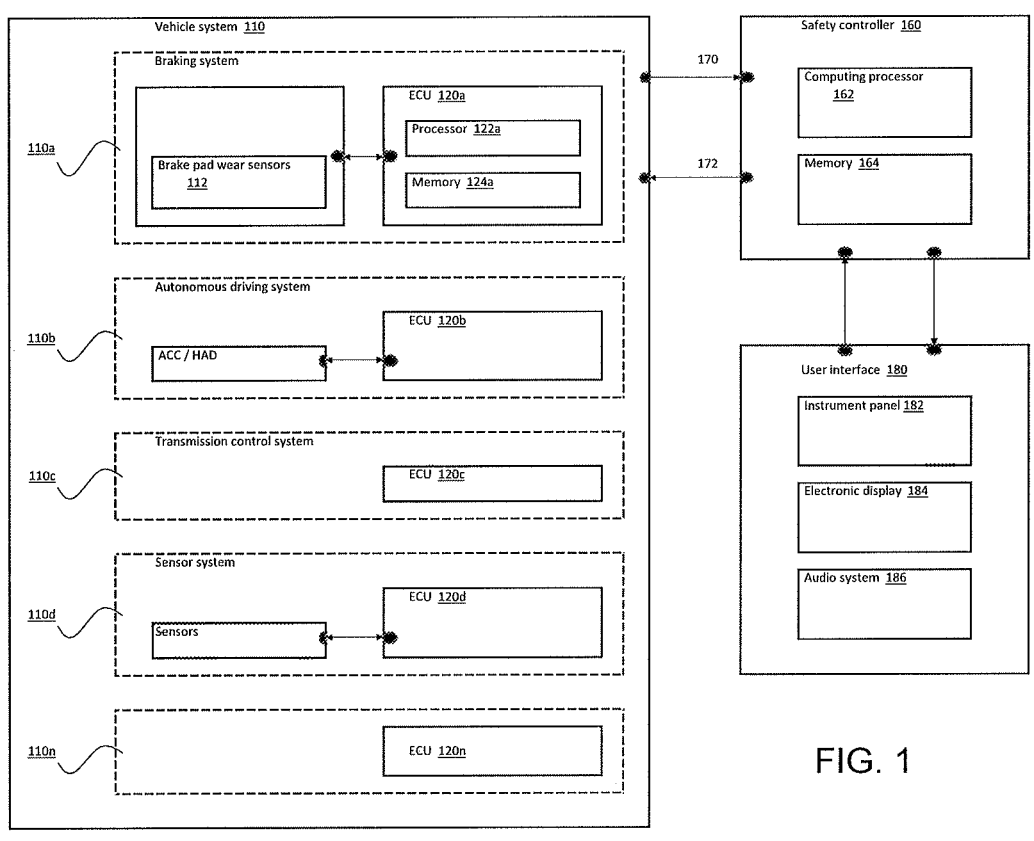
FIG. 1 is a schematic view of a vehicle comprising a safety controller in communication with a vehicle system and a user interface according to an exemplary implementation.

FIG. 1 presents an exemplary diagram of a vehicle 100 comprising a vehicle system 110, a safety controller 160 and a user interface 180 in accordance with one implementation of this disclosure.

The vehicle system 110 may comprise of a plurality of subsidiary systems 110a, 110b, . . . 110n. For example, in FIG. 1, the vehicle system comprises a braking system 110a such as an electronic braking system which may be responsible for the activation and control of all braking components in the vehicle such as the parking brake and service brakes, diagnostic and monitoring of the braking components (e.g. brake fluid level and temperature, brake disc rotor temperature), deceleration control and automatic assistance functions (e.g. an auto hold function which prevents a vehicle from accidentally rolling away when it is stationary). The braking system 110a comprises one or more electronic brake pad sensors 112, each of which is designed to detect when one or more sets of brake pads it is coupled to is worn down to one or more predetermined amount and transmit a corresponding warning signal upon such detection. For example, the brake pad sensors may be configured to produce a warning signal only when the set of brake pads is worn down to the point of requiring replacement or additionally when it is 50% worn out. Depending on the design of the sensors, each brake pad sensor may be responsible for detecting the extent of wear associated with one or more sets of brake pads.

The braking system 110a also comprises an electronic control unit (ECU) 120a which is in communication with the other components of the braking system and is primarily responsible for the operation of the braking system. The ECU 120a may comprise a processor 122a and a hardware memory 124a in communication with the processor 122a. The ECU may, for example, be a general computing device and the processor 122a take the form of a central processing unit (CPU). Alternatively, dedicated devices such as an application-specific integrated circuit (ASIC), microcontroller or any other computing processor capable of accessing the memory 124a to store information and execute instructions stored in the memory may also be suitable. The memory 124a stores information accessible by the processor 122a such as data and instructions, which may be executed, stored, retrieved or otherwise used by the processor 122a. For example, the brake pad sensors may send a brake pad signal to the ECU 120a indicating that a set of brake pads have been worn down and require replacement. Upon receiving the brake pad signal, the ECU 120a may execute instructions stored in the memory 124a and take one or more actions such as analysing the signal, transmitting the signal to the safety controller or storing information associated with the brake pad signal in the memory 124a. The memory 124a may be a hard drive, flash memory, random-access memory or any other type of non-transient memory. Alternatively, the memory 124a may also be integrated with the computing processor as a single IC.

In some implementations, the vehicle system 110 also comprises other vehicle subsidiary systems such as an autonomous driving system 110b which is responsible for executing semi-autonomous and autonomous driving functions such as adaptive cruise control (ACC), active lane assist, highly automated driving (HAD) and park assist. There may, also be a transmission control system 110c which controls the automatic transmission functions of the vehicle and uses information from various vehicle sensors and other subsidiary systems such as an engine control system to determine when and how to shift gears. In this exemplary implementation, the transmission control system 110c is also responsible for controlling the transmissions associated with various vehicle driving modes such as sports, economy and comfort driving modes.

The vehicle system may also include a sensor system 110d comprising one or more sensors used to detect various vehicle and environment related information. The sensors may include on-vehicle sensors (e.g. cameras, lidar and radar sensors) and remote sensors (e.g. V2V sensors) which are in communication with the sensor system 110d and/or the vehicle system 110 through for example wireless communication (e.g. bluetooth, radio and infrared waves). It is to be appreciated that the vehicle system 110 may include other vehicle subsidiary systems not discussed herein and the functions associated with each subsidiary system may also differ from those described above. For example, the transmission control system may be combined to form an integrated subsidiary system with engine control.

Each vehicle subsidiary system 110a-n may include an ECU 120a-n having a structure and capabilities as described above in connection with the ECU 120*a* in the braking system 110*a*. Other variations are also possible. For example, the functions of several ECUs may be integrated into one ECU or each ECU may comprise multiple processors and/or memories located in separate housing.

The vehicle 100 also includes a safety controller comprising a computing processor 162 and a hardware memory 164 in communication with the computing processor 152. The processor 162 may be a CPU, ASIC, microcontroller or other hardware computing processor capable of performing the functions described in this disclosure. The processor 162 is configured to retrieve and store data in the memory 164 as well as execute instructions or programs stored therein. The memory may be hard disk, flash memory, random-access memory or other non-transient memory capable of performing the same function. It is to be appreciated that although the processor and memory are illustrated as being located within the same physical housing in FIG. 1, this is not essential and they may be located separately. Furthermore, in some examples, the processor 152 and memory 164 may actually comprise multiple processors and/or memories that may or may not be located within the same physical housing. In other examples, the memory 164 may also be integrated with the processor as a single integrated circuit. In yet another implementation, the safety controller 160 may be a remote safety controller which is capable of performing the same functions described in this disclosure but is located away from the vehicle. The remote safety controller may receive data, issue commands and otherwise communicate with the vehicle system, user interface and other components of the vehicle wirelessly.

The safety controller 160 is in communication with the vehicle system 110 including some of the ECUs 120*a-n* and components associated with the respective subsidiary systems 110*a-n* of the vehicle system 110. Input signals sent by the vehicle system 110 to the safety controller 160 are represented by reference numeral 170 while output signals from the safety controller to the vehicle system 110 represented by 172. The safety controller 160 may communicate with the vehicle system via a controller area network (CAN), a bus standard which allows devices to communicate with each other without a host computer.

The safety controller 160 is in communication with a user interface 188 which may be used for communicating audio and visual messages to the driver. The user interface may comprise an instrument panel 182, an electronic display 184 and an audio system 186. The instrument panel 182 may be a dashboard or a centre display which displays for example, a speedometer, tachometer, warning light indicators, and fuel and oil pressure gauges. The warning light indicators may be light icons which alert a driver of the vehicle on the status of vehicle features such as the electronic parking brake (EPB), brake, anti-lock brake system (ABS) and airbag system. The warning light indicators may display a yellow or orange colour to indicate that the associated vehicle feature needs to be serviced or replaced soon and a red light to indicate that the feature has a serious safety issue and the vehicle is unsafe to be driven. The user interface 180 may also comprise an electronic display 184 for displaying other visual messages to the driver (for example via an infotainment system or heads up display), and an audio system 186 for playing audio messages, warning or music.

In one implementation, the one or more brake pad 112 sensors in the braking system may be configured to send a warning signal to the ECU 120*a* of the braking system 110*a* when the brake sensor(s) detect that a brake pad has been worn down to a predetermined amount.

Upon receiving the warning signal, the ECU 120*a* transmits a brake pad signal 170 to the processor 162 of the safety controller 160. The brake pad signal 170 comprises information on the identity of a set of source brake pads which the signal corresponds to and a pad wear value indicating the extent of pad wear associated with the source brake pads. The brake pad signal 170 may also include other information such as timing the warning signal was issued by a brake pad sensor. Alternatively, the brake pad signal may also be communicated directly from the brake pad sensors 112 to the processor 162.

After receiving the brake pad signal 170, the processor 162 may verify if the pad wear value in the brake pad signal exceeds a pad wear threshold. In some implementations, the computing processor 162 may determine if a critical event has occurred in response to the pad wear value exceeding the pad wear threshold. A critical event is defined as one which makes it unsafe to offer one or more first level vehicle features due to the predicted condition of the brake pads either alone or in combination with other conditions associated with the vehicle and/or its environment. The occurrence of a critical event may be detected by analysing vehicle operating data transmitted to the processor and deriving the predicted condition of the brake pads and other conditions therefrom. Vehicle operating data refers to any information relevant to the operating of a vehicle and may comprise information indicative of one or more of vehicle dynamics, the current state of the vehicle, the vehicle's environmental conditions or driving environment or a combination thereof. The current state of the vehicle may include information such as condition of the vehicle tires, braking system and/or transmission control system and distance travelled by the vehicle. The condition of a vehicle's braking system and transmission control systems may be determined from components forming part of these subsidiary systems. For instance, the condition of the vehicle's braking system may be assessed based on factors such as the brake fluid level and temperature, brake disc rotor temperature, state of the parking/service brakes or a combination thereof. As for the condition of a vehicle's tires, various parameters may be considered in making such an assessment such as presence of any leakage or puncture in the tires, tire pressure, age of tires or a combination thereof. Data obtained directly from sensors mounted on the tires and/or other signals available outside of the tire itself such as wheel rotational speeds may be used to determine the parameters indicative of tire condition. Vehicle operating data may be transmitted to the processor 162 either automatically or upon request by the processor 162. In one implementation, a critical event occurs when the total distance travelled by a vehicle since an initial detection of the pad wear threshold being exceeded crosses a mileage threshold. Alternatively, other characterisations of a critical vent may also be suitable and more than one event may qualify as a critical event.

Upon determining that a critical event has occurred, the processor 162 may cause one or more first level vehicle features to be disabled immediately. In some implementations, the disabling of one or more first level vehicle features may also be further based on information relating to other vehicle operating data. For instance, the one or more first level behaviours may only be executed if the values of other vehicle operating data which are critical to vehicle safety exceed acceptable limits. This other vehicle operating data may comprise the condition of at least one of vehicle tires, braking system or transmission control system. Vehicle operating data related to the vehicle's driving environment may also be considered such as road surface conditions and curvature of roads being traversed by the vehicle. Disabling of first level vehicle features includes stopping features which have already been activated. The wearing down of brake pads have an impact on braking efficiency thereby making it potentially unsafe to operate a vehicle in a semi or fully autonomous mode as characteristics such as braking distance and force may no longer accurately estimated. Therefore, first level vehicle features being disabled may include semi or fully autonomous driving features such as adaptive cruise control (ACC) and highly automated driving (HAD). All semi or fully autonomous driving features with the exception of accident avoidance components may also be disabled as part of the first level vehicle features such that vehicle has to be driven manually.

Apart from determining the occurrence of a critical event when a pad wear value exceeds the pad wear threshold, the processor 162 may also additionally determine based on vehicle operating data, a degradation delay from an initial detection of the pad wear threshold being exceeded. The processor 162 causing one or more first level behaviours to be executed based on the degradation delay reaching a delay threshold. The triggering of one or more first level behaviours may also be further based on information relating to other vehicle operating data. That is, the decision of whether to trigger one or more first level behaviours may also take into account information relating to other vehicle operating data. For instance, the one or more first level behaviours may only be executed if the values of other vehicle operating data which are critical to vehicle safety exceed acceptable limits. This other vehicle operating data may comprise the condition of at least one of vehicle tires, braking system or transmission control system. In some implementations, the one or more first level behaviours comprises disabling of one or more first level vehicle features including an autonomous or semi-autonomous mode of operating the vehicle. Alternatively, the processor may only check if the degradation delay has reached a delay threshold and omit the step of checking for the occurrence of a critical event altogether.

In one implementation, the processor may be configured to determine if a degradation delay from an initial detection of the pad wear threshold being exceeded by determining if the counter value of a brake pad counter has reached the maximum counter value. If the answer is affirmative, the processor proceeds to cause the execution of one or more first level behaviours. As discussed above, apart from the counter value reaching the maximum counter value, the decision of whether to execute one or more first level behaviours may also take into account information relating to other vehicle operating data. As discussed in the above paragraphs, some implementations of the disclosure may also provide for the same one or more first level behaviours to be triggered by the occurrence of a critical event. The brake pad counter may be activated upon an initial detection of a brake pad signal with a pad wear value exceeding the brake wear threshold. In one implementation, the counter value is subsequently increased by a first value each time both the pad wear value from a received brake pad signal exceeds the pad wear threshold and a first predefined condition is met. An example of a first predefined condition is the actuation of the vehicle ignition switch from an on to off position. This actuation may be performed manually by a driver of the vehicle or automatically by the vehicle upon detecting that a driver has parked the car. Additionally, the first value may be a constant value or variable. In the case of a variable, the first value quantum may be chosen based on information in the brake pad signal. For example, a higher first value is used when the source brake pads are front brake pads compared to when they are rear brake pads because the front brake pads generally wear down at a faster rate compared to the rear brake pads due to differences in materials used.

In some implementations, the processor additionally determines whether a second predefined condition is met. The second predefined condition may selected from a list of one or more possible second predefined conditions stored in the memory 164. If the processor 162 determines that the second predefined condition has been met, the processor 162 increases the counter value of the brake pad counter by a second value. Therefore, both the second predefined conditions and the first predefined conditions discussed below may contribute to an increment in counter value. This second predefined condition may be tied to conditions which accelerate the wearing down of brake pads thus making it beneficial for safety reasons to have the one or more first level behaviour to be triggered earlier. Examples of the second predefined condition include specified driving patterns, vehicle status and/or environmental conditions.

In some, implementations the second predefined condition may be fulfilled if one or more specified driving patterns which accelerate brake wear have been applied to the vehicle over a specified period of time, distance and/or at a specified frequency. Examples of such driving patterns include those characterised by high vehicle dynamic braking and/or aggressive driving. For instance, a vehicle speed of more than 100 km/hr and braking force of 0.4 G or more, may be considered as high vehicle dynamic braking. Driving patterns may be determined by analysing data on the vehicle's status, vehicle dynamics and/or environmental conditions. These data may be collected by on-board and external sensors or sources and transmitted to the processor 162. The data may be in the form of real time and/or historical data. The historical data may be stored in the memory 164 of the safety controller. For example, data regarding a vehicle's movement such as speed and application of throttles/brakes may be monitored over a specified time, frame and driving pattern derived therefrom.

Apart from the above mentioned one or more first level behaviours which may be triggered by the detection of a critical event or the counter value reaching a maximum counter value, the processor may also cause the execution of one or more second level behaviours which alerts, encourages and/or incentivises a driver to replace brake pads which have exceeded the pad wear threshold. The conditions for triggering second level behaviours are preferably structured such that the second level behaviours are triggered before the first level behaviours. Additionally, any loss of vehicle operation associated with the second level behaviours are preferably also less disruptive to a driver compared to the first level features. The rationale behind the second level behaviour being to provide tiered approach to warning a driver of the need to replace faulty brake pads.

In some implementations, the processor calculates a pad deterioration value and causes the execution of at least one or more second level behaviour based the pad deterioration value. The pad deterioration value may be tied to an initial detection of a pad wear value exceeding the pad wear threshold or conditions indicative of the extent of brake wear since such initial detection. In the latter case, the pad deterioration value may be calculated based on counter value, distance travelled or length of time passed since an initial detection the pad wear threshold being exceeded or a combination thereof. In one implementation the second level behaviour comprises disabling a vehicle's sports mode when it is operating in a semi or fully autonomous driving mode such as ACC or HAD. Sports mode refers to driving patterns involving high vehicle speed, high deceleration and high brake temperature. This may be accomplished by the processor 162 sending instructions to the autonomous driving system 110b and/or transmission control 110c in FIG. 1. Additionally or in the alternative, the one or more second behaviour may also involve communicating visual and/or audio warning signals to the driver via the user interface 180 may also be executed. In another implementation, the processor may also trigger the execution of third, fourth and other additional levels of behaviour based on the pad deterioration value. Any loss of vehicle operation associated with the different levels of behaviour becoming more disruptive to the driver the longer the driver waits to replace any faulty brake pads.

Figure 2:
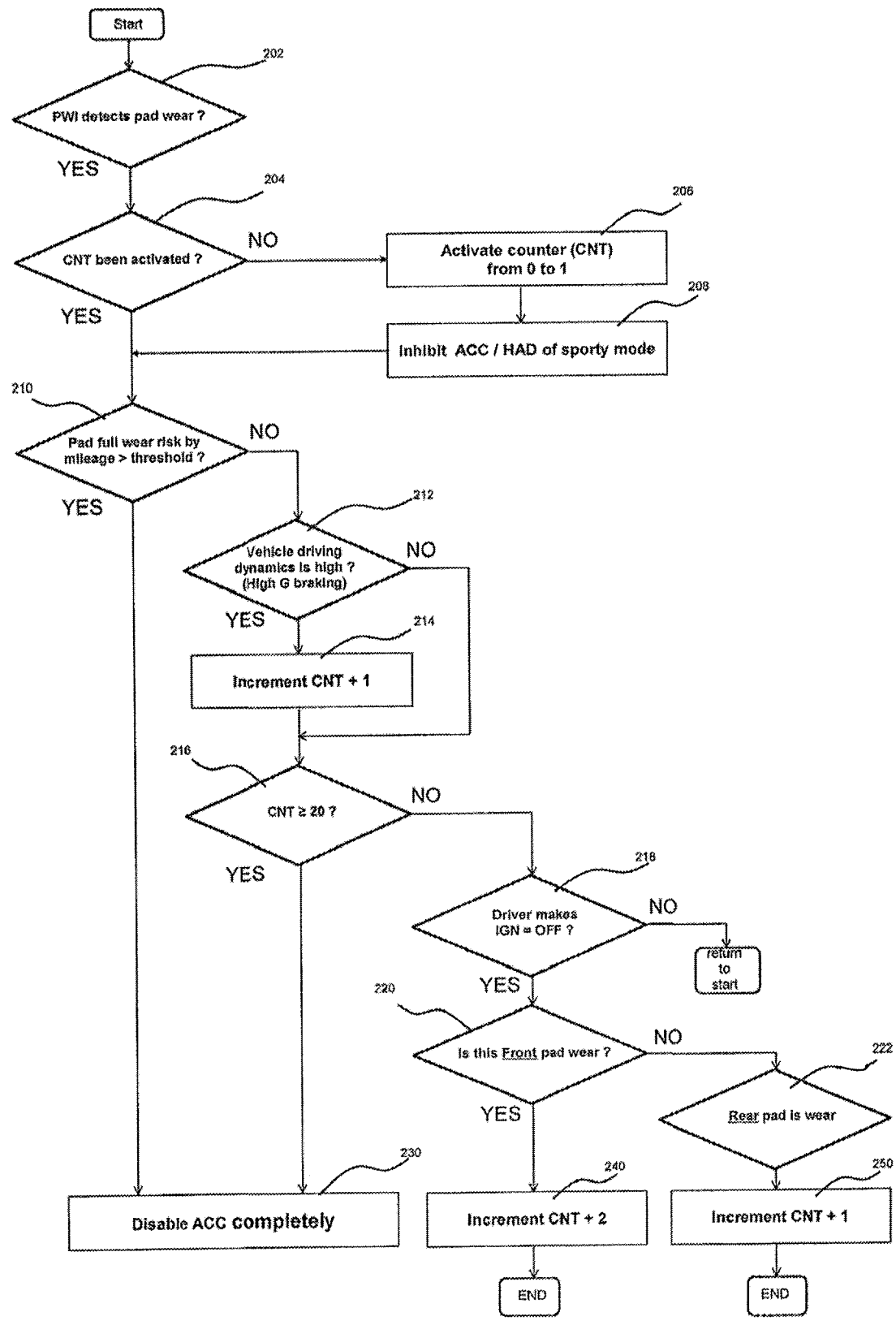
FIG. 2 is a flow diagram illustrating a method for detecting brake wear signals and taking or more actions in response thereto, according to an exemplary implementation.

FIG. 2 is a flow chart 200 illustrating an exemplary method of operating a vehicle in accordance with one implementation of this disclosure. The method starts at decision block 202 where a processor 162 of the safety controller 160 in FIG. 1 determines if a brake pad signal 170 transmitted by the braking system 110a has a pad wear value which exceeds a pad wear threshold. As described in relation to FIG. 1, the brake pad sensors 112 in the braking system 110a are configured to send a warning signal when it detects a set of brake pads being worn down to a predetermined amount. A brake pad signal indicating a set of source brake pads which the signal corresponds to and a pad wear value indicating the extent of brake pad wear associated with the source brake pads is then transmitted to the processor 162. In some implementations, the pad wear threshold may be defined as being exceeded only when a pad wear value indicates that a brake pad requires replacement as opposed to only being worn down to a level less than that requiring replacement e.g. 50%.

If the processor determines that the pad wear value exceeds the pad wear threshold, then at block 204, the processor 162 determines if a brake pad counter has been activated. If the processor determines at block 204 that the brake pad counter has been activated, the process goes on to block 210. In the implementation shown in FIG. 2, the counter value of the brake pad counter is set to 0 when no brake pads require replacement and activated when the counter value is more than 0. The brake pad counter is activated by increasing the counter value from 0 to 1 upon an initial detection of a brake pad signal with a pad wear value exceeding the brake, wear threshold. Therefore, if the processor determines at decision block 204 that the brake pad counter has not been activated, then at block 206, the processor 162 activates the brake pad counter by setting the counter value from 0 to 1. The counter value is reset to 0 when faulty brake pads have been replaced and the processor determines at block 202 that there are no brake pads with pad wear value exceeding the pad wear threshold. In an exemplary implementation, the switching on of the vehicle ignition may trigger the brake wear sensor 112 to activate an electrical checking signal which detects if any of the brake pads on the vehicle are worn down to the point of requiring replacement. If none of the brake pads are worn down to the point of requiring replacement, brake pad signals with a pad wear value not exceeding the pad wear threshold will be sent to the safety controller thereby causing the safety controller to reset the counter value of the brake pad counter.

At block 208, the processor calculates a pad deterioration value and causes the execution of one or more second level behaviour if the pad deterioration value is within a specified threshold. Any loss in vehicle operation associated with the second level behaviour is preferably less disruptive to the driver compared to the first level behaviour. The rationale being that the triggering of, one or more second level behaviour allows the driver to be alerted, in a less severe manner compared to the first level behaviour. In the implementation shown in FIG. 2, the threshold value is met when the counter value has a numerical, value of at least one and the second level behaviour consists of disabling of the vehicle's sports mode when it is operating in a semi or fully autonomous driving mode such as ACC or HAD. This is less disruptive compared to the complete disabling of ACC or HAD which may be a corresponding first level behaviour. Sports mode refers to driving patterns involving high vehicle speed, high deceleration and high brake temperature. Such driving patterns accelerate brake pad wear and therefore disabling it in the ACC or HAD mode may give the driver more time to replace worn down brake pads.

It is to be appreciated that other pad deterioration values and second level behaviour may also be suitable. For example, the pad deterioration value may also be based on conditions indicative of the extent of brake wear since such initial detection and calculated based on counter value, time lapsed or distance travelled since an initial detection of a pad wear value exceeding the pad wear threshold, or a combination thereof. The second level behaviour may also comprise the communication of visual and/or audio warning signals to the driver via the user interface 180.

In other implementations (not shown in FIG. 2), the method of operating the vehicle may also provide for different levels of behaviour to be executed based on the pad deterioration values. Specifically, the levels may be structured such that the longer the driver waits to replace worn down brake pads (that is, the brake pads get more worn down), the greater the level of disruption caused to the driver by the respective behaviours being executed.

At decision block 210, the processor 162 determines if a critical event has occurred. If a critical event has occurred, then at block 230 the processor issues instructions to cause the execution of one or more first level behaviour including the disabling of at least one or more first level vehicle features. A critical event is defined as one which makes it unsafe to offer one or more first level vehicle features due to the predicted condition of the brake pads alone or in combination with other conditions associated with the vehicle and/or its environment (e.g. vehicle dynamics, the current state of the vehicle, environmental conditions). In some implementations, the execution of one or more first level behaviours may also be further based on information relating to other vehicle operating data such as the condition of at least one of the vehicle tires, braking system or transmission control system. That is, the decision of whether to trigger one or more first level behaviours not only takes into account the occurrence of a critical event but also information relating to other vehicle operating data. For instance, the one or more first level behaviours may only be executed if the values of other vehicle operating data which are critical to vehicle safety exceed acceptable limits. This other vehicle operating data may comprise the condition of at least one of vehicle tires, braking system or transmission control system. Vehicle operating data associated with the vehicle's driving environment may also form part of the criteria for determining whether to execute one or more first level behaviours. In some variations, the one or more first level behaviours being executed may comprise the disabling of one or more first level vehicle features including an autonomous or semi-autonomous mode of operating the vehicle. In FIG. 2, a critical event is determined to have occurred when the total distance travelled by a vehicle since an initial detection of the pad wear threshold being exceeded is over a mileage threshold. The distance travelled gives an indication of the degree of brake pad wear that has occurred since the initial detection of the pad wear threshold being exceeded. Brake pad manufacturers typically evaluate brake wear rate as a function of distance travelled. Accordingly, the mileage threshold for a critical event may be evaluated therefrom. In one implementation the ECU 120b of an autonomous driving system 110b may store the vehicle mileage when the load wear threshold is initially exceeded in its memory. At decision block 210, the processor 162 compares the current mileage with the stored mileage in the ECU 120b of an autonomous driving system 110b. If the difference between the two values exceeds a predefined mileage threshold e.g. 300 km, a critical event is determined to have occurred.

If the processor 162 determines at decision block 210 that a critical event has occurred, then at block 230, the processor 162 causes one or more first level behaviour to be executed including the disabling of at least one first level vehicle feature. In the implementation of FIG. 2, the processor 162 causes the ACC function to be completely disabled by issuing instructions to the autonomous driving system 110b in FIG. 1. It may also be suitable to disable all autonomous driving features instead of just the ACC function and require the vehicle to be driven manually save for the accident avoidance components or just disable HAD functions. In another implementation, other semi or fully autonomous driving functions such as HAD may also constitute a first level vehicle feature.

On the other hand, if the processor determines at decision block 210 that no critical events have occurred, then at decision block 212, the processor determines if a second predefined condition is met. The second predefined condition is preferably be tied to conditions which accelerate the wearing down of brake pads thus making it beneficial for the first level behaviour to be triggered earlier. Examples of the second predefined condition include specified driving patterns, vehicle status and/or environmental conditions. In the implementation of FIG. 2, the second predefined condition comprises having one or more driving patterns characterised by high vehicle dynamic braking and/or aggressive driving applied to the vehicle over a specified period of time, distance and/or at a specified frequency. For instance, a vehicle speed of more than 100 km/hr and braking force of 0.4 G, may be considered as high vehicle dynamic braking behaviour. In order to determine whether one or more specified driving patterns have been applied to the vehicle, the processor may request for vehicle operating data such as vehicle speed, deceleration and braking information from the vehicle system 110 over a period of time and keep a log of such information.

If the processor 162 determines at decision block 212 that the second predefined condition has been met, then at block 214, the processor 162 increases the counter value of the brake pad counter by a second value. In the implementation of FIG. 2, the counter value is increased by one. Other values may also be suitable. This increment in counter value upon the second predefined condition being met advantageously allows conditions which accelerate the wearing down of brake pads to be factored in thus bringing forward the triggering of first level behaviour. On the other hand, if the second predefined condition has not been met, the counter value is not increased and the process goes directly to block 216.

At decision block 216, the processor determines if the maximum counter value has been reached. In the implementation of FIG. 2, the maximum counter value is set at 20 with the first predefined condition defined as the actuation of the vehicle ignition switch from an on to off position. This example assumes that brake pads on average should be replaced within 10 days of an initial detection of pad wear threshold being exceeded and an average vehicle driver makes on average of 2 trips per day. It is to be appreciated that other maximum counter values may also be suitable depending on, for example, the criteria for first predefined condition and rate of brake pad wear. If the maximum counter value has been reached, then at block 230, the processor causes the execution of one or more first level behaviours including the disabling of a first level vehicle feature such as ACC as shown in FIG. 2. In some implementations, the execution of one or more first level behaviours such as the disabling of one or more first level vehicle features may also be further based on information relating to other vehicle operating data. For instance, the one or more first level behaviours may only be executed if the values of other vehicle operating data which are critical to vehicle safety exceed acceptable limits. This other vehicle operating data may comprise the condition of at least one of vehicle tires, braking system or transmission control system. Vehicle operating data associated with the vehicle's driving environment may also form part of the criteria for determining whether to execute one or more first level behaviours such as the disabling of one or more first level vehicle features.

If the processor determines at decision block 216 that the maximum counter value has not been reached, then at decision block 218, it checks if a first predefined condition has been met. In the implementation of FIG. 2, the first predefined condition is the actuation of the vehicle ignition switch from an on to off position. Other first predefined conditions such as vehicle mileage and time elapsed since the initial detection of pad wear being exceeded may also be suitable. If the processor determines that the first predefined condition has not been met, the process restarts at block 202. If the processor determines at decision block 218 that the first predefined condition has been met (e.g. the vehicle ignition switch has been actuated from on to off), the processor checks at block 220 if the source brake pads exceeding the pad wear threshold are front or rear brake pads. If they are front brake pads, then at block 240, the brake counter value is increased by first value of 2 while if they are rear brake pads, the process goes to block 222 and then block 250 where the counter value is increased by a first value of 1. Varying the first value based on the identity of the source brake pads, requiring replacement advantageously takes into account situations where one set of brake pads wear down at a faster rate compared to another. In this example we have assumed that the front brake pads wear down more quickly. Therefore, by using a higher first value for the front brake pads, the maximum counter value which triggers the first level behaviour is reached earlier. For example, if the first value is 2 instead of 1, the maximum counter value is reached after 10 ignition cycles compared to 20 for the latter case. After the counter value is increased in blocks 240 and 250, the process ends. In the implementation of FIG. 2, the process is started again when the vehicle is turned on. In another implementation where the first predefined condition does not involve the switching off of the ignition, the process in FIG. 2 may be repeated so long as the ignition is on.

Figure 3:
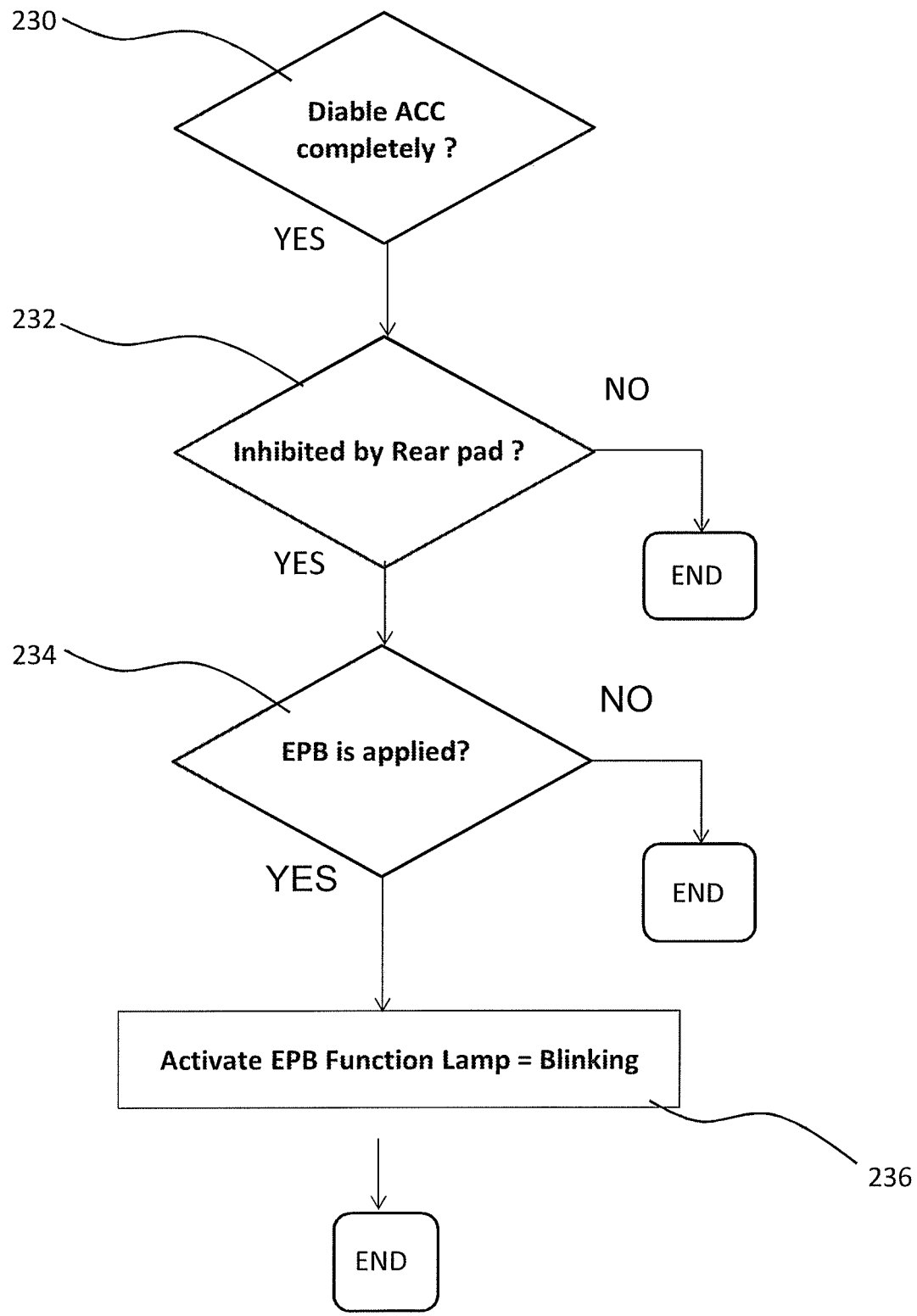
FIG. 3 is flow diagram according to another exemplary implementation.

In some implementations of the disclosure, it may be desirable for further actions to be carried out in response to the disabling of one or more first level vehicle features. In the exemplary implementation shown in FIG. 3, disabling of the ACC function in block 230 triggers additional steps which result in an electronic parking brake (EPB) indicator displaying a warning signal if the following conditions are met. Firstly, the ACC function was disabled due to rear brake pads requiring replacement and secondly the electronic parking brake is in operation. It is desirable for the EPB warning signal to be displayed under such conditions because the clamping force in the EPB may be insufficient when the rear brake pads are worn down to a level sufficient to trigger the disabling of the ACC function. Accordingly, in decision block 232, the processor 162 determines if disabling of the ACC function in block 230 was triggered by the rear brake pads exceeding the pad wear threshold. If the processor determines that it is not, the process ends. On the other hand, if the processor determines that the disabling of the ACC function in block 230 was triggered by the rear brake pads exceeding the pad wear threshold, the processor determines in decision block 234 if the EPB is being applied.

If the processor determines at block 234 that the EPB is being applied, at block 236 the processor causes an EPB indicator such an EPB function lamp on an instrument panel to issue a warning signal by Winking. This warning serves to alert the driver that the EPB clamping force might be insufficient. Other methods of alerting the driver of the same may also be deployed. For example, causing the user interface 180 to display a text message on an electronic display 184 of an infotainment system stating that the EPB clamping force may be insufficient, playing a verbal warning through the audio system 186 or a combination thereof. Preferably, the text or verbal message includes a description that the EPB clamping force is sufficient and the driver may also be warned of the severity of the fault. On the other hand, if the EPB is not being applied, no action is taken and the process ends.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular implementations only, and is not intended to be limiting.

What is claimed is:

1. A method for operating a vehicle comprising:
   receiving, at a processor, a brake pad signal from a braking system of the vehicle, each brake pad signal comprising information on a pad wear value associated with a set of source brake pads;
   determining, by the processor, whether the pad wear value from the brake pad signal exceeds a pad wear threshold;
   determining, by the processor, in response to the pad wear value exceeding the pad wear threshold, a degradation delay from an initial detection of the pad wear threshold being exceeded, wherein the degradation delay is determined as a counter value which is incremented in response to vehicle operating data satisfying at least one predefined condition, the incrementing beginning from the initial detection of the pad wear threshold being exceeded;
   determining, by the processor, in response to the brake pad signal exceeding the pad wear threshold whether a second predefined condition is met;
   increasing the counter value by a second value in response to the second predefined condition being met; and
   causing, by the processor, a disabling of one or more first level vehicle features including an autonomous or semi-autonomous mode of operating the vehicle based on the degradation delay reaching a delay threshold, wherein determining if the degradation delay has reached the delay threshold comprises determining if the counter value has reached a maximum counter value beginning from the initial detection of the pad wear threshold being exceeded.

2. The method of claim 1, further comprising:
   calculating, by the processor, a pad deterioration value in response to the brake pad signal exceeding the pad wear threshold; and
   causing, by the processor, the execution of one or more second level behaviour in response to the pad deterioration value being within a specified threshold.

3. The method of claim 2, wherein the second level behaviour comprises disabling the one or more a second level vehicle features, wherein any loss of vehicle operation associated with the second level vehicle features is less disruptive to a driver of the vehicle compared to the first level vehicle features.

4. The method according to claim 1, further comprising:
   determining, by the processor, in response to the brake pad signal exceeding the pad wear threshold whether a critical event has occurred based on the vehicle operating data; and
   causing, by the processor, the disabling of the one or more first level vehicle features including an autonomous or semi-autonomous mode of operating the vehicle based at least in part on the critical event occurring.

5. The method of claim 4, wherein the critical event is defined as having occurred when a total distance travelled by the vehicle since an initial detection of the pad wear threshold being exceeded crosses a distance threshold.

6. The method of claim 1 wherein the first predefined condition comprises actuating a vehicle ignition switch from an on to off position.

7. The method of claim 6, wherein the first value varies depending on whether the source brake pads are front brake pads or rear brake pads of the vehicle.

8. The method of claim 7 wherein a higher first value is used when the source brake pads are the front brake pads compared to when the source brake pads are the rear brake pads.

9. The method of claim 1, wherein determining whether the second predefined condition is met comprises determining whether one or more specified driving patterns have been applied to the vehicle over a specified period of time, distance and/or at a specified frequency.

10. The method of claim 9, wherein the one or more specified driving pattern comprises driving patterns which are characterized by dynamic braking and/or aggressive driving.

11. The method according to claim 1 wherein the step of causing the disabling of one or more first level vehicle features is further based on information relating to other vehicle operating data.

12. A safety controller for a vehicle comprising:
   a processor;
   at least one memory coupled to the processor and storing instructions executable by the processor causing the processor to:
   receive a brake pad signal from a braking system of the vehicle, each brake pad signal comprising information on a pad wear value associated with a set of source brake pads;

determine whether the pad wear value from the brake pad signal exceeds a pad wear threshold;

determine, in response to the pad wear threshold being exceeded, a degradation delay from an initial detection of the pad wear threshold being exceeded, wherein the degradation delay is determined as a counter value which is increased by a first value in response to vehicle operating data satisfying a first predefined condition, the incrementing beginning from the initial detection of the pad wear threshold being exceeded;

determine, by the processor, in response to the brake pad signal exceeding the pad wear threshold whether a second predefined condition is met;

increase the counter value by a second value in response to the second predefined condition being met; and cause a disabling of one or more first level vehicle features including an autonomous or semi-autonomous mode of operating the vehicle based on the degradation delay reaching a delay threshold, wherein determining if the degradation delay has reached the delay threshold comprises determining if the counter value has reached a maximum counter value beginning from the initial detection of the pad wear threshold being exceeded.

13. The safety controller of claim 12, wherein the at least one memory further causes the processor to:

calculate a pad deterioration value in response to the brake pad signal exceeding the pad wear threshold; and cause the execution of one or more second level behaviour in response to the pad deterioration value being within a specified threshold, wherein the second level behaviour comprises disabling one or more a second level vehicle features, wherein any loss of vehicle operation associated with the second level vehicle features is less disruptive to a driver of the vehicle compared to the first level vehicle features.

14. The safety controller according to claim 12, wherein the at least one memory further causes the processor to:

determine in response to the brake pad data exceeding the pad wear threshold whether a critical event has occurred based on the vehicle operating data; and cause the disabling of the one or more first level vehicle features including an autonomous or semi-autonomous mode of operating the vehicle based at least in part on the critical event occurring.

15. The safety controller according to claim 12, wherein the disabling of one or more first level vehicle features caused by the processor is further based on information relating to other vehicle operating data.

* * * * *